Aug. 8, 1967 R. H. APPELDORN 3,334,958
NESTED FRESNEL-TYPE LENSES
Filed Aug. 7, 1963

INVENTOR
ROGER H. APPELDORN
BY
Carpenter, Abbott, Coulter & Kinney
ATTORNEYS

United States Patent Office 3,334,958
Patented Aug. 8, 1967

3,334,958
NESTED FRESNEL-TYPE LENSES
Roger H. Appeldorn, White Bear Lake, Minn., assignor to Minnesota Mining and Manufacturing Company, St. Paul, Minn., a corporation of Delaware
Filed Aug. 7, 1963, Ser. No. 300,467
6 Claims. (Cl. 350—211)

This invention relates to an improvement in optical refractors and more particularly to an improved method of shaping the opposed faces of the bodies forming a lens or refractor system to insure an accurate optical alignment of said bodies.

Heretofore there has been difficulty in accurately aligning the lens elements wherein a pair of lens elements of the Fresnel type are matched together providing a multi-component lens having a predetermined optical function. Previously, the lenses of this type have been made in such a manner that the opposing inner faces of the lens elements may or may not contact with each other but in either case the opposing faces of the lens elements have not mechanically aided in the alignment of the lens elements.

The present invention provides means for readily, accurately, and optically aligning the lens elements so that a pair of said lens elements must necessarily properly perform their intended function.

An advantage of the present invention is that considerable time is saved in placing a pair of lens elements in proper registry and the provision of means for effecting a "nesting" relationship between the lens elements may be easily incorporated during the cutting or formation of the lenses.

A further advantage of the present invention is that the lens components are "nested" together and all contact between the opposed refracting faces is made in the "dark band" or light void optically inactive areas inherent in such lenses and without causing an increase in the width or size of the "dark bands."

These and other advantages are attained in accordance with the present invention by providing a lens comprising two transparent Fresnel type lens elements having a smooth surface and an opposite circularly-grooved surface defining an optical axis with the grooved surfaces fitting together in register on a common optical axis, wherein each grooved surface comprises a series of contiguous concentric annular ridges, and wherein at least one ridge of each of said elements contacts a refracting conoidal slant face of the other elements, all as will now be more fully described and illustrated in connection with the accompanying drawing, wherein:

Figure 1:
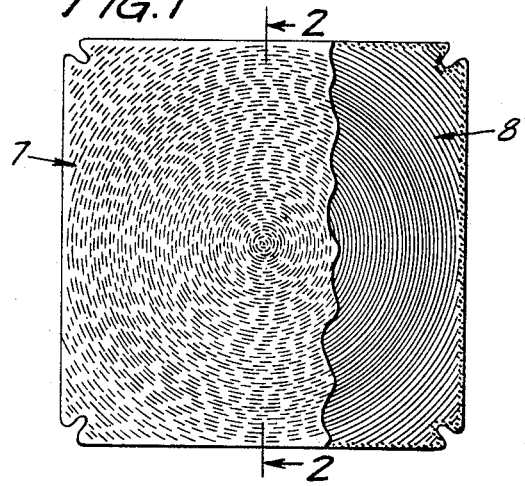
FIGURE 1 is a schematic plan view of a pair of lens elements joined together to form a lens having a desired optical property, a portion of one element being cut away.
Figure 2:
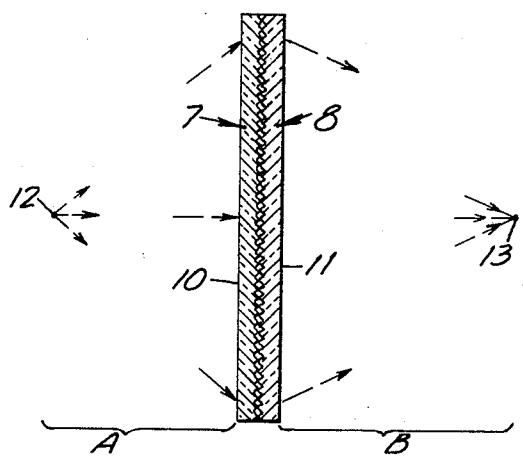
FIGURE 2 is a schematic sectional view of the structure of FIGURE 1 taken along line 2—2 of FIGURE 1.

Referring now to the drawing, there is shown in FIGURES 1 and 2 a multi-element lens or refractor wherein the lens is made in two sections, each section consisting of a lens of the Fresnel type with the two sections joined in aligned face-to-face contact. A multi-element lens may be designed to refract light directing a bundle of intercepted light rays toward a fixed point or directing the intercepted rays into substantially parallel rays when the rays originate from a point source. As shown in FIGURES 1 and 2 the lens comprises a pair of transparent matching plate-like bodies or sheets 7 and 8. One face of each of the bodies 7 and 8 is impressed or otherwise constructed with a plurality of contiguous concentric annular ridges defining an optical axis, each ridge having an inner conoidal slant face and an outer conoidal slant face. In the embodiment illustrated in FIGURES 1 and 2 the refracting faces of the bodies are positioned in opposed contacting relationship and the optical system is designed as a converging system wherein the optically active radially spaced annular faces of each body have radially inwardly progressively greater inclination relative to the optic axis and each annular face on each body has a common focus with reference to said axis. The front surface 10 of the body 7 is smoothly continuous and may be curved, but in the illustrated embodiment, has an infinite radius, i.e. is planar. The surface 11 of the body 8 is also a smoothly continuous or planar surface and has an infinite radius. Light from a source 12 positioned a distance A from the surface 10 of the body 7, as illustrated by the divergent arrows, is intercepted by the surface 10 and refracted slightly toward the axis of the system. These rays then emerge and are refracted from the body 7 on the inner face through the optically active annular faces toward the optically active annular faces of the body 8. The rays are again refracted on the faces of body 8 toward the optic axis and emerge from the surface 11 and are again refracted to converge on the focal point 13 spaced a distance B from the body 8, wherein the distance B may be less than, equal to or greater than the distance A.

The lens elements may be stamped from plastic material such as, for example, polymerized methyl methacrylate. The molds are formed from master lenses on which the prismatic ridges are precision machined. The stamped lenses are paired as predetermined and are then placed in axial registry between a pair of dies on a punch press. The lenses are easily placed in registry, due to the "nesting" relation of the opposed interfaces as will hereinafter be more fully described. The press die cuts the edges of the lenses to the desired shape. Meanwhile the edges of the dies are heated to fuse the lenses together around the outer die-cut edge, thereby forming a unitary hermetically sealed lens structure.

Figure 3:
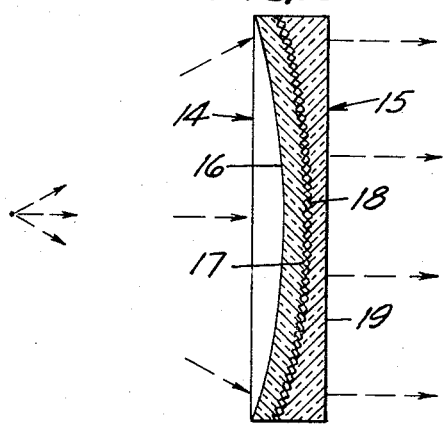
FIGURE 3 is a schematic sectional view of a modification of the lens of FIGURES 1 and 2.

As illustrated in FIGURE 3 the optical system may be made of matching lens bodies of varying shape with outer surfaces of varying smooth contour such as therein illustrated. The invention however has particular application as applied to refractors with spherical or infinite radius opposed surfaces.

In FIGURE 3 the optical system is arranged to divert the light from a point source into a columned beam. The optical system illustrated includes a pair of lens bodies 14 and 15. The body 14 has a front surface 16 which is a continuous concave surface designed for a desired refractive effect, for example to minimize reflection and refractive losses. The body 14 is formed with an inner refracting surface 17 of the Fresnel type which is concave to the direction of light travel. The body 15 has a concave inner refracting surface 18 of the Fresnel type matching that of the body 14 and has a continuous outer surface 19 of infinite radius. The surfaces 17 and 18 fit together in registry on a common axis and, together with the outer refractive surfaces 16 and 19, provide the required refraction to produce the desired optical effect.

Figure 4:
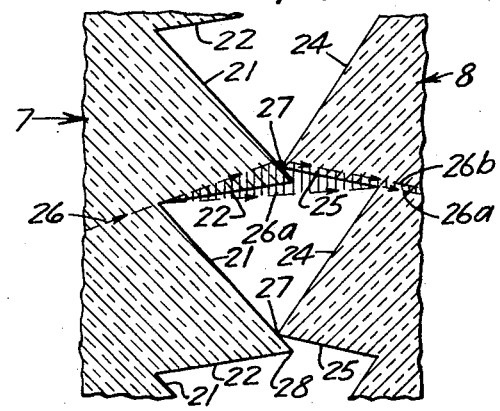
FIGURES 4, 5 and 6 are fragmentary detailed sectional views on an enlarged scale showing the opposed light refracting interfaces of a converging lens at various radial distance from the center of said converging lens.
Figure 5:
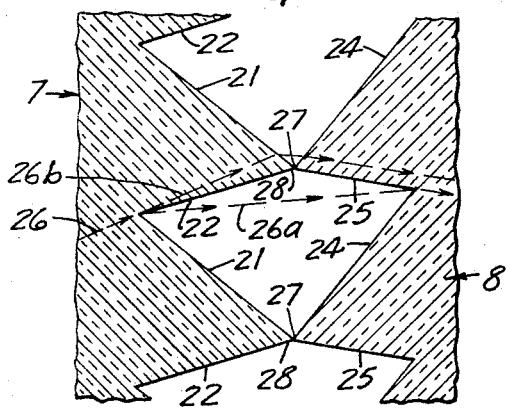
Figure 6:
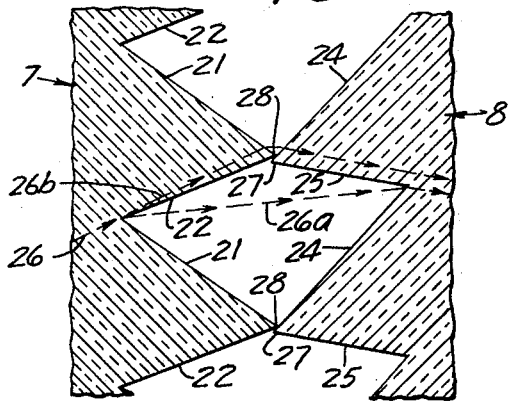

FIGURES 4, 5 and 6 illustrate in cross-section and on an enlarged scale certain typical concentric prismatic convolutions on the opposed inner faces of a converging lens or refractor system of the invention. The greater the number of convolutions provided on a lens, the more homogeneous the lens will appear. Presently, it is relatively easy to form a lens having 50 definite ridges per inch measured radially outwardly from the axis thereof; lens surfaces having as many as 1000 ridges per inch are contemplated, as providing more nearly continuous optical surfaces and a still more homogeneous projected light beam.

FIGURE 4 illustrates the 199th and 200th prismatic ridge, measuring outwardly, or upwardly as shown in the drawing, from the optic axis, of a converging lens such as that schematically illustrated in FIGURES 1 and 2. The figure also illustrates the relative relationship of a first series of the opposed optically active faces of the lens bodies. The lens body 7 has a first series of ridges formed by optically active annular radially outer slant faces 21 which intersect with optically inactive inner slant faces 22 to define a series of annular prismatic ridges. The refractory or optically active portion of faces 21 have a definite slope designed so as to obtain the desired refractive effect at the particular distance each face is spaced from the optic axis, to divert the incident light as desired. The ridges of body 7 are matched or paired with a first series of prismatic ridges on the other lens body 8 which are defined by optically active annular radially outer slant faces 24 and optically inactive inner slant faces 25. In opposed spaced relation as shown the faces 21 and 24 provide the desired refracting characteristic. In any matched set of lenses of the Fresnel type both lenses are provided with the same number of ridges on the opposed inner faces.

As illustrated in FIGURE 4, contiguous parallel light rays, shown as a bundle of rays 26 emitted from a source 12 (FIGURE 2) are separated at the bottom of the groove between each pair of ridges on the element 7. One portion 26a of the bundle of generally parallel light rays travels across the full width of the annulet or annular space between the elements reaching the opposing active face 24 of lens element 8 substantially at its juncture with face 25. The remaining portion 26b of the bundle continues through element 7 to the next radially outer slant face 21, travels across the adjoining annulet, and reaches the opposing, outer slant face 24 of element 8 near the crest of the ridge, passing through element 8 along a path slightly removed or spaced from and converging with that of portion 26a as shown. The separation of light rays by the ridges and grooves, resulting in no light from source 12 passing through the lens elements between the separated bundles of light, causes the "dark band" areas illustrated by the shaded area in FIGURE 4.

The separated rays in portions 26a and 26b would be slightly spaced and directed through element 8 on converging paths because of the change in inclination of each active radially outer slant face 21 and 24 on a converging refractor. The angle between the active faces 21 and 24 and the axis of each component decreases outwardly from the center of the lens component.

The inclination of each slant face 21 and 24 gives the refractive effect desired and determines the size of the dark bands. The optically inactive faces on the other hand may be varied in angular relation to afford the desired nesting relationship between the lens bodies.

As illustrated in FIGURE 4 the crests or ridge lines 27 of the ridges on the lens body 8 contact the active slant faces 21 of the lens body 7. This effect is achieved by having the ridge lines 27 fall radially outwardly of the crests or ridge lines 28 of the ridges on the lens body 7. It is also to be noted that this contact between the ridge of one body and the slant faces of the other is within the dark band area and does not in any way interfere with the refracted light.

FIGURE 5 illustrates another series of convolutions of the converging lens formed by lens bodies 7 and 8 and illustrates for example the 259th and 260th ridges, i.e. about 5 inches from the axis. In this figure the ridge lines 27 and 28 meet in the dark band area. With the opposed ridges meeting in this manner they play no part in aligning the lens bodies radially, but they help to maintain a definite axially spaced relation between the two lens bodies.

In FIGURE 6, which illustrates a pair of convolutions, for example the 299th and 300th, typifying still another series of the ridges, it is to be noted that the ridge lines 28 of the lens body 7 are radially outwardly spaced from the ridge lines 27 of the body 8. In this position the ridge lines 28 engage the outer slant faces 24 of the lens body 8. This relationship between the opposed faces is effected by the inclination of the inactive slant faces 22. The relationship of the second series of ridges of FIGURE 6 with the first series of ridges illustrated in FIGURE 4 overcomes any tendency for one lens to slide and tilt with respect to the axis of the other when pressing the two together as is the case if all the ridges are matched as shown in either FIGURES 3, 4 or 5. With the opposed faces matched as illustrated, the refracting faces are easily and necessarily placed in alignment and are properly spaced to give the refractory characteristics for the pair of lenses as calculated. The number of repetitions of each series or the number of ridges included in each series is considered a matter of choice.

The annular ring-like spaces formed between the opposed interfaces of the bodies may contain various transparent refractive materials other than air or the material forming the bodies to give varying refractive effects and to provide versatility for a lens. Examples of such fluids other than air are water, oils, solutions of silver salts, fluorocarbons, etc., which change the index of refraction in the ring-like spaces and the focal length of the refractor.

It is contemplated to be within the spirit of this invention that the opposed ridges make surface contact with each other and not merely line contact, e.g. of ridge line 27 with face 24, as illustrated to effect the result desired. While this and other modifications, which will be obvious to one skilled in the art after having studied this description, may be made it shall be understood that all such modifications are within the spirit and scope of the present invention as are defined by the appended claims.

What is claimed is:

1. A lens comprising two transparent Fresnel type lens elements each having a smooth surface and an opposite circularly-grooved surface defining an optical axis and with the grooved surfaces fitting together in registry on a common optical axis, each grooved surface consisting of a plurality of contiguous concentric annular ridges, the ridges each having a radially inner conoidal slant face and a radially outer conoidal slant face and defining respectively on each element a first set of slant faces and a second set of slant faces, the angles of the faces of one set on each element having a radially inwardly progressively greater inclination relative to the optical axis and being such that light from a source at one side of said lens directed toward each of the slant faces of said one set is refracted thereby exclusively toward the corresponding faces of the same set on the other of said elements leaving narrow dark band areas between the paths of the refracted light, and the other set of said slant faces of each element being positioned between and connecting the slant faces of said one set so as to lie within said dark band areas, at least one ridge of each of said elements contacting a conoidal slant face of said one set on the other element within the dark band area near the peak of said contacted slant face to provide positive alignment of said elements with all ridges in cooperating locations, and said lens having a focal point on said common optical axis.

2. A lens according to claim 1 wherein said lens elements are sealed together at their edges.

3. A condensing lens comprising two transparent plate-like Fresnel type lens elements each having a smooth surface and an opposite circularly-grooved surface defining an optical axis and with the grooved surfaces fitting together in registry on a common optical axis, each grooved surface consisting of a plurality of contiguous concentric annular ridges, the ridges each having a radially inner conoidal slant face and a radially outer conoidal slant face, the angles of the outer slant faces of the ridges on each element having a radially inwardly progressively greater inclination relative to the optical axis and being positioned such that light from a point source on said common optical axis at one side of said lens striking the smooth surface of one said element is refracted thereby and at said outer slant faces of said one element exclusively toward the outer slant faces of the other of said elements, leaving narrow dark band areas between the paths of the refracted light, the inner slant faces on said elements being positioned between and connecting said outer slant faces so as to lie within said dark band areas, at least one ridge of each of said elements contacting an outer conoidal slant face on the other element within a said dark band area near the peak of said outer slant face to provide positive alignment of said elements with all ridges in cooperating locations, and said lens having a focal point on said common optical axis.

4. A condensing lens according to claim 3 wherein said lens elements are sealed together at their edges.

5. A condensing lens according to claim 3 wherein said smooth surfaces are substantially planar and said lens elements are formed of fusible plastic and are sealed together around their outer edges.

6. A condensing lens according to claim 5 wherein said lens elements are sealed by fusing the elements together around their outer edges.

References Cited
UNITED STATES PATENTS

| | | | |
|---|---|---|---|
| 351,609 | 10/1886 | Macbeth | 240—106.1 |
| 719,066 | 1/1903 | Wadsworth | 88—60 |

JEWELL H. PEDERSEN, *Primary Examiner.*

R. J. STERN, *Assistant Examiner.*